United States Patent [19]

Dabandjian et al.

[11] Patent Number: 5,138,901
[45] Date of Patent: Aug. 18, 1992

[54] BICYCLE LOCK MOUNTING BRACKET

[76] Inventors: Ara N. Dabandjian, 13787 Mango Dr., Del Mar, Calif. 92014; Roberto D. Uribe, 4508 Olive Ave., La Mesa, Calif. 91941

[21] Appl. No.: 819,075

[22] Filed: Jan. 10, 1992

Related U.S. Application Data

[63] Continuation-in-part of Ser. No. 756,759, Sep. 9, 1991.

[51] Int. Cl.⁵ .............................................. B62K 21/12
[52] U.S. Cl. ..................... 74/551.8; 74/551.1; 70/233; 224/31; 224/41; 280/288.4
[58] Field of Search ............... 74/551.1, 551.8; 70/233, 258, 18; 224/30 A, 31, 41; 280/288.4, 297

[56] References Cited

U.S. PATENT DOCUMENTS

| | | | |
|---|---|---|---|
| 2,063,493 | 12/1936 | Douglas | 74/551.8 |
| 3,967,475 | 7/1976 | Zane | 70/233 X |
| 4,155,231 | 5/1979 | Zane et al. | 70/233 X |
| 4,256,322 | 3/1981 | Otsuka et al. | 70/233 X |
| 4,541,555 | 9/1985 | Miree | 224/30 A X |
| 4,674,306 | 6/1987 | Halpern | 70/233 |
| 4,697,725 | 10/1987 | Miree | 224/41 |
| 4,750,754 | 6/1988 | Lennon | 280/261 |
| 4,878,397 | 11/1989 | Lennon | 74/551.1 |
| 4,888,967 | 12/1989 | Kuo | 70/233 X |
| 5,033,325 | 7/1991 | Giard, Jr. | 74/551.3 |
| 5,092,142 | 3/1992 | Zane et al. | 70/233 X |

FOREIGN PATENT DOCUMENTS 335610 10/1989 European Pat. Off. ............ 74/551.8

Primary Examiner—Rodney H. Bonck
Assistant Examiner—Andrea Pitts
Attorney, Agent, or Firm—Henri J. A. Charmasson

[57] ABSTRACT

A bicycle lock having a horseshoe-shaped loop member and a keyed cross-bar member is mounted about the center of a handlebar in a forwardly orientation where it can be grabbed by the rider in a forward-bent racing position.

9 Claims, 4 Drawing Sheets

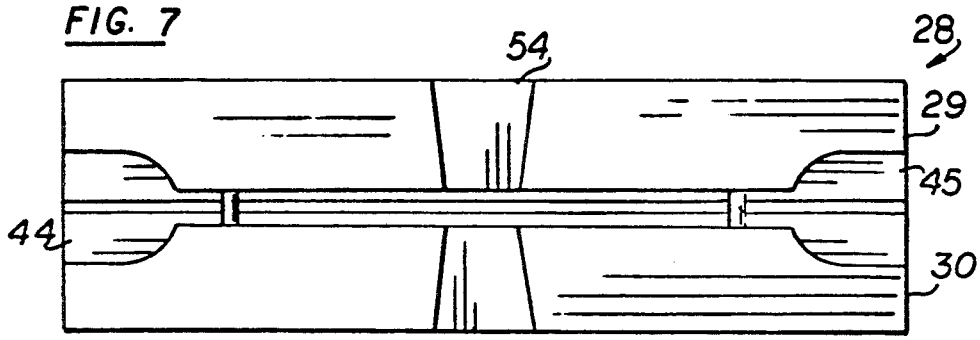
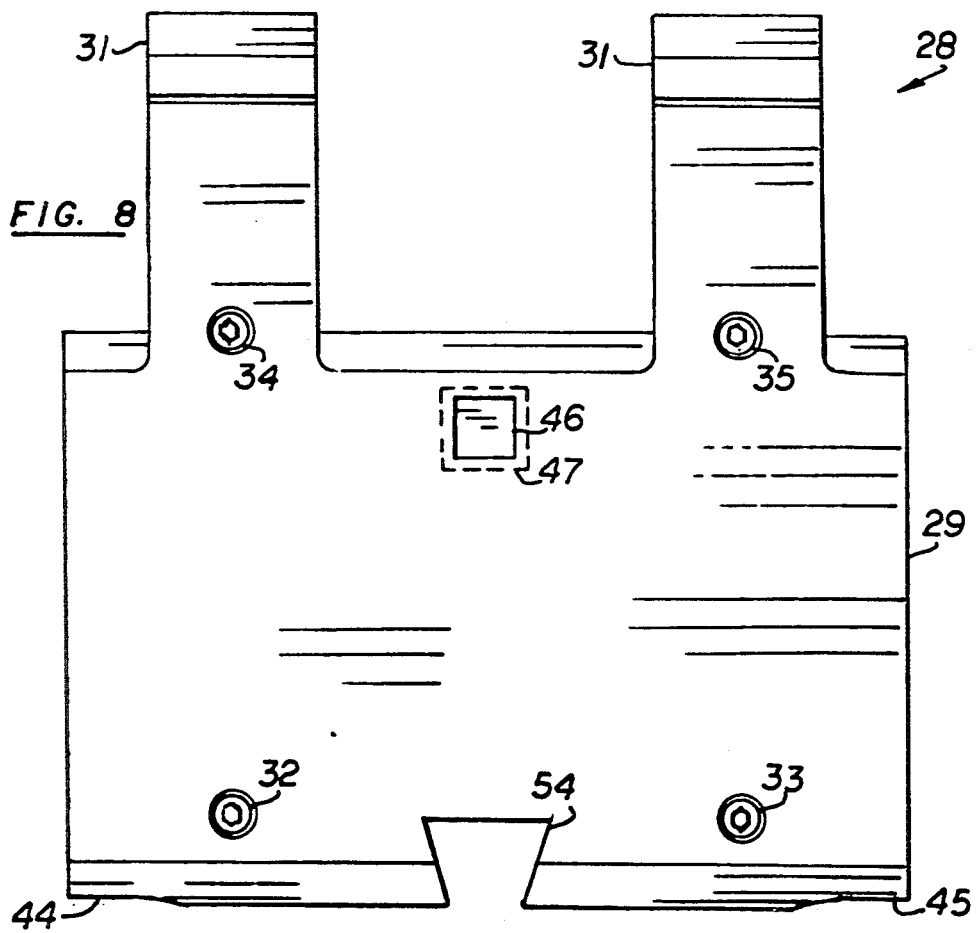
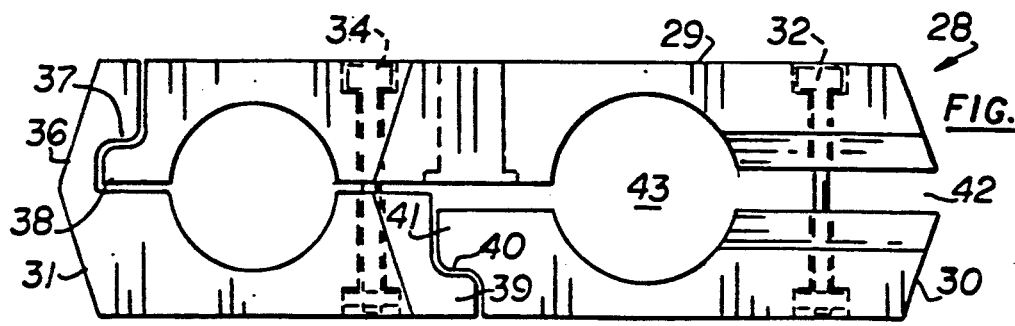

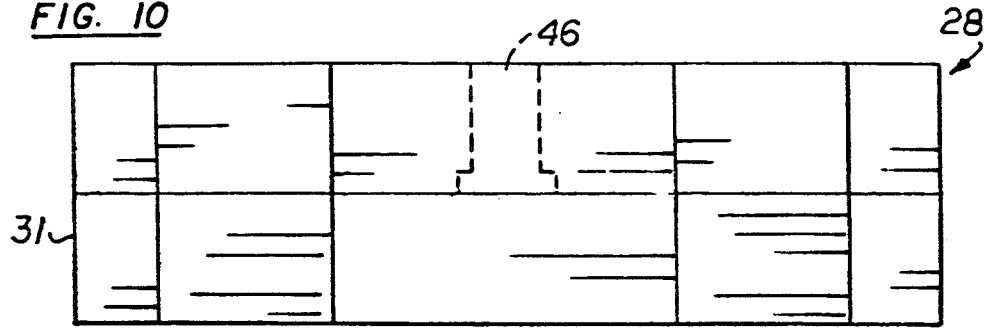
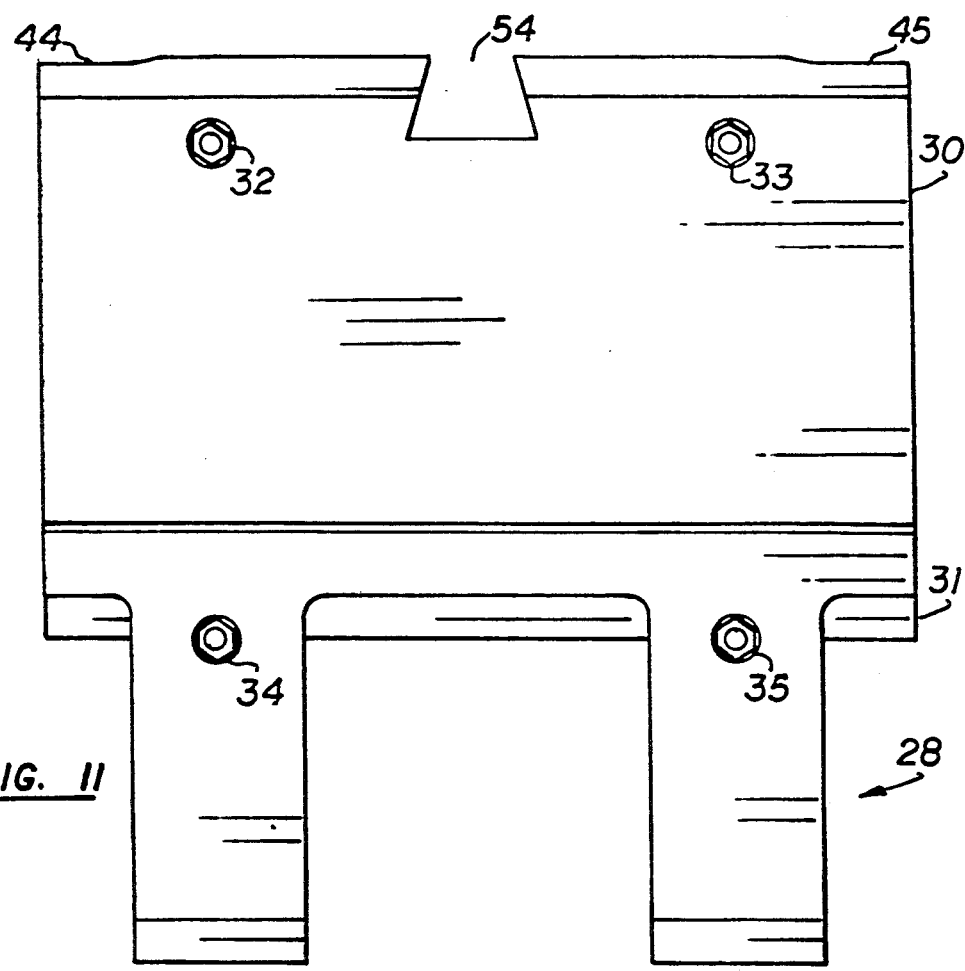
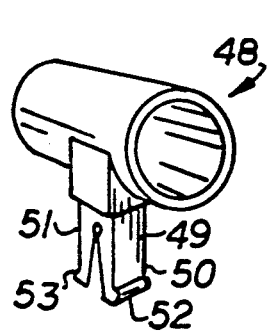
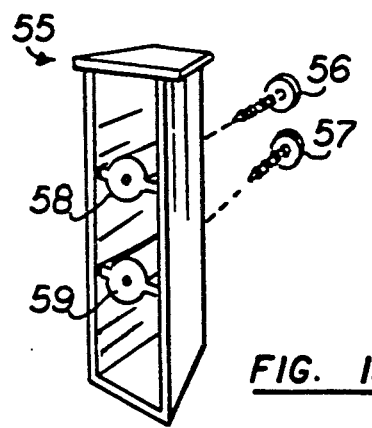

BICYCLE LOCK MOUNTING BRACKET

PRIOR APPLICATION

This is a continuation in part of co-pending application Ser. No. 07/756,759 filed Sep. 9, 1991.

FIELD OF THE INVENTION

This invention relates to bicycle accessories, more specifically to accessory mounting brackets.

BACKGROUND OF THE INVENTION

One of the most secure and effective types of bicycle locking devices consists of a forged steel member in the general shape of a horseshoe having extended parallel extremities which engage into the side of a keyed locking cylinder. The steel member can be wrapped around a section of the bicycle frame and a bicycle rack or other fixed structure and its bay closed by the cylinder. The cylinder has a locking mechanism engaging notches in the parallel ends of the steel member. Various types of brackets have been designed to mount this relatively heavy and cumbersome locking device on a section of the bicycle. The most common of those brackets attaches to the frame, preferably to the post supporting the seat, and is designed to hold the loop steel member parallel to the seat supporting post and within the plane of the bicycle frame. Bicycle enthusiasts, however, prefer to reserve that space for mounting other accessories such as a beverage container. It would therefore be advantageous to have a device which would place the lock, when not in use, in a different location.

SUMMARY OF THE INVENTION

The main and secondary objects of this invention are to provide a convenient bracket for mounting a loop-type bicycle lock in a location where it does not interfere with the mounting of other accessories, and in a manner that allows use of the lock as a handlebar extension while riding the bicycle in a forward-bending racing position.

These and other valuable objects are achieved by a bracket which clamps on the center section of the handlebar on either side of its hub and has a transversal cavity shaped and dimensioned to receive the closing cylinder of the lock, and two forward-directed, parallel cavities to receive the open ends of the loop member.

BRIEF DESCRIPTION OF THE DRAWING

FIG. 7 is a front elevational view of a second embodiment of the invention;

FIG. 8 is a top plan view thereof;

FIG. 9 is a side elevational view thereof;

FIG. 10 is a back elevational view thereof;

FIG. 11 is a bottom plan view thereof;

FIG. 12 is a perspective view of a top-mounted accessory bracket; and

FIG. 13 is a front-mounted accessory bracket.

DESCRIPTION OF THE PREFERRED EMBODIMENTS OF THE INVENTION

Figure 1:
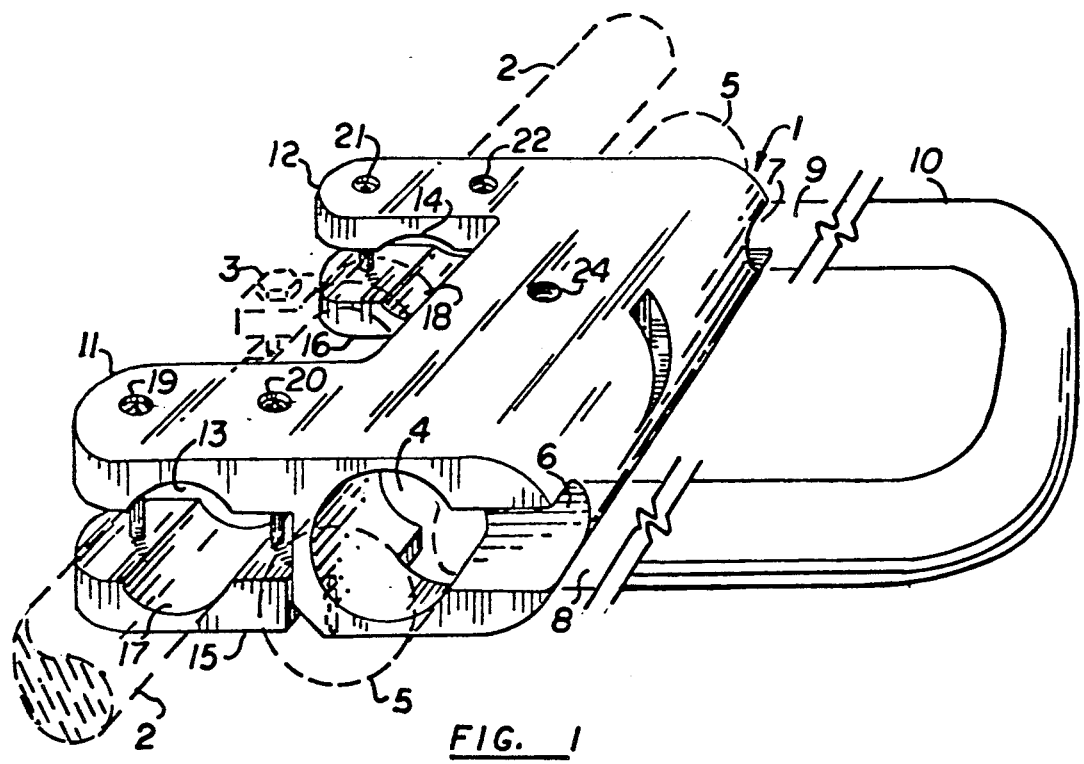
FIG. 1 is a perspective view of the bicycle lock mounting bracket.

Referring now to the drawing, there is shown in FIG. 1, a mounting bracket 1 which is clamped on the central section of a bicycle handlebar 2 shown in phantom lines on opposite sides of the handlebar mounting ring 3. The bracket has a transversal cylindrical cavity 4 that is dimensioned to accept the loop-closing cylinder 5 of a bicycle lock also shown in phantom lines. The cylindrical cavity is intercepted at a right angle by two parallel cross-channels 6, 7 which are shaped, sized and positioned to engage over the end portions 8, 9 of the steel loop member 10 of the lock. Accordingly, the loop member 10 projects forwardly from the lock mounting bracket 1 and toward the bicycle direction of travel that is determined by the orientation of the handlebar 2.

The two cross-channels 6, 7 have the same diameter and spacing as the two cross-holes of the locking cylinder 5 which are intended to receive the end portions 8, 9 of the loop member 10. Accordingly, the end portions of the loop member can be safely locked into the position illustrated in FIG. 1.

The lock mounting bracket 1 is secured on the handlebar 2 by clamping assemblies comprising two projections 11, 12 at the rear, top portion of the bracket having underneath concavely arcuate bearing surfaces 13, 14 dimensioned to rest upon the top surface of the handlebar 2, and adjustable clamps 15, 16. The clamps also have concavely arcuate bearing surfaces 17, 18 into which the underside of the handlebar 2 can nest. The clamps 15, 16 can be tightened against the handlebar by two pairs of screws 19, 20 and 21, 22 passing through bores in the rearward projections 11 and 12 on either side of the handlebar 2 and engaging corresponding threaded holes in the clamps 15, 16.

In order to reduce the mass and weight of the bracket 1 a portion of its rear and bottom surface 23 has been grounded out. A threaded hole 24 is provided in the central portion of the bracket for mounting other accessories such as a light, a beverage container mounting bracket, or a camera pod, none of which are shown on the drawing.

While FIG. 1 shows the bracket 1 and loop member 10 held in a generally horizontal position, it should be understood that the clamping mechanism allows for the vertical orientation of the bracket and loop member at different angles. In the example illustrated in FIG. 6, the bracket 5, and loop member 10 are slanted at approximately 15 degrees from the horizon so that they can be more effectively used as an extension of the handlebar 2 that can be grabbed near the arcuate end of the loop member 10 by the bicycle rider 25 when adopting a forward-bending position to minimize drag. Accordingly, the lock mounting bracket 5 not only provides a non-obtrusive location for holding the lock when the bicycle is being used, but also turns the lock into a convenient extension of the handlebar which can comfortably be held in certain riding positions.

In this first alternate embodiment of the invention the lock mounting bracket is made of two separate and symmetrical half-sections 26, 27 which correspond to the first embodiment minus the central portion between the clamping elements 11, 15 and 12, 16.

Figure 6:
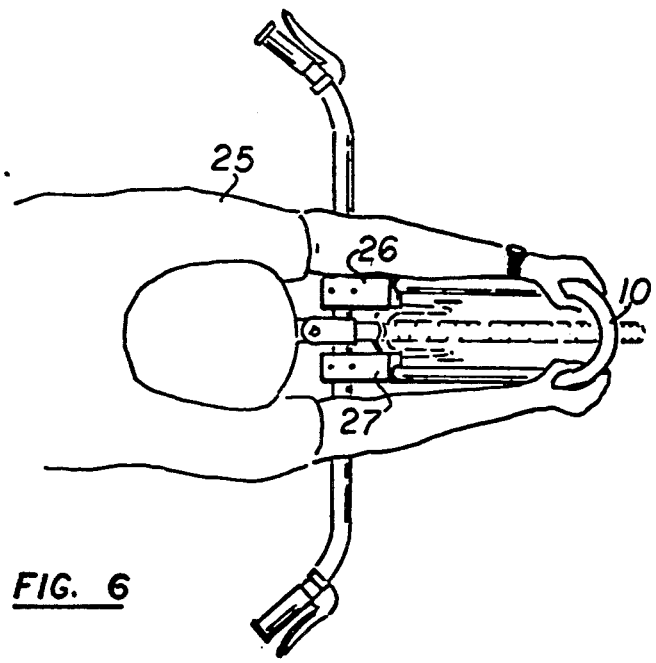
FIG. 6 is a top plan view of a combination of a first alternate embodiment of the lock, mounting bracket and bicycle in use as a handlebar extension.
Figure 2:
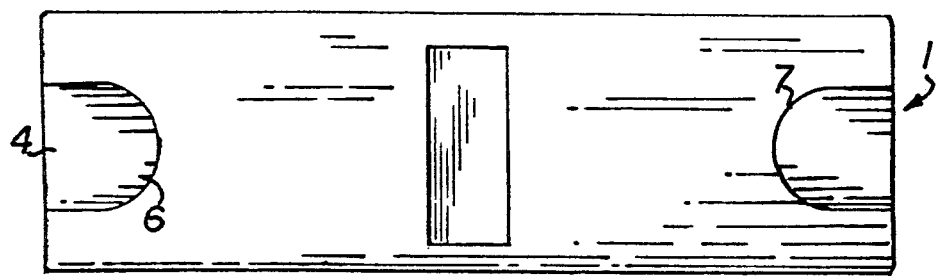
FIG. 2 is a front elevational view thereof.
Figure 3:
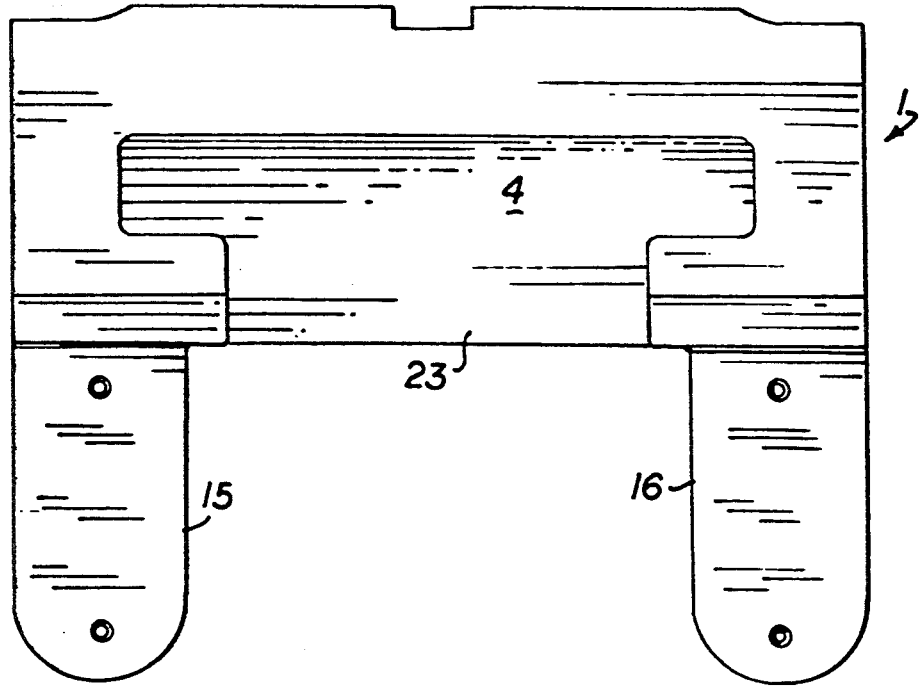
FIG. 3 is a bottom plan view thereof.
Figure 4:
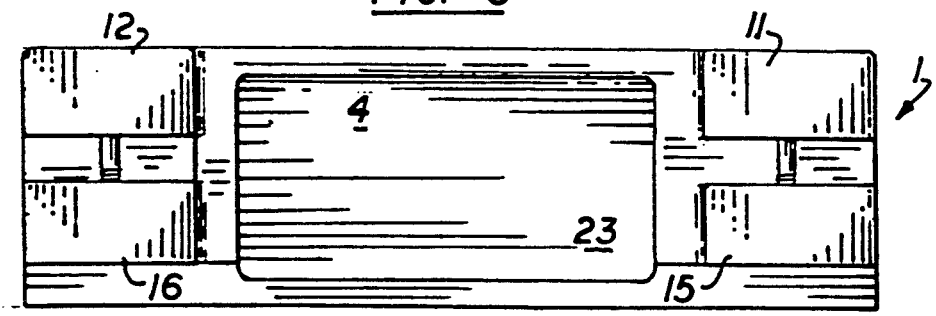
FIG. 4 is a back elevational view thereof.
Figure 5:
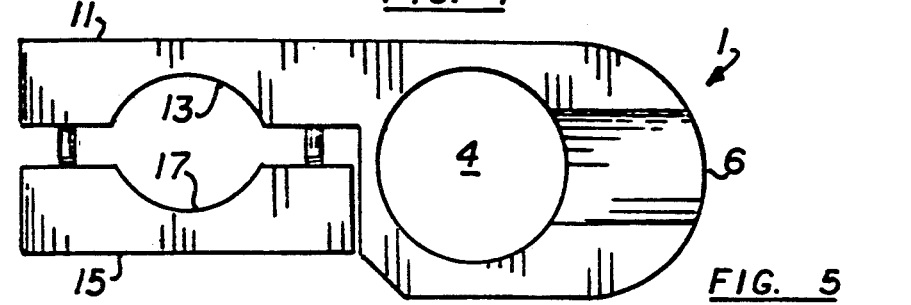
FIG. 5 is a side elevational view thereof.

A second alternate embodiment 28 of the invention illustrated in FIGS. 7-11 is designed to accommodate bicycle lock cylinders and loop members of various diameters, and to positively clamp said locks to provide a stable and vibration-free attachment. This second alternate embodiment has the same general shape as the first described embodiment 1, except that the entire bracket is split along its median horizontal plane into a top element 29 and bottom element 30 which can be adjustably brought together in a clamping movement over the lock cylinder and loop member. The bottom portion of the jaws clamping around the handlebar consists of a single member 31. The two clamping mechanisms require together only two pairs of nuts and bolts 32, 33 and 34, 35. The bottom handlebar clamping member 31 has a rear projection 36 which forms a groove 37 into which a flange 38 in the rear portion of the top member 29 engages. The ledge of the groove 37 provides a fulcrum for the top member clamping movement over the handlebar when nut and bolt assemblies 32 and 33 are tightened. The lower forward edge 39 of the handlebar clamping member 31 projects forward to form a ledge 40. A flange 41 formed in the rear upper portion of the bottom member 30 bears against that ledge 40 forming a fulcrum for clamping the top and bottom members 29, 30 around the lock by means of nut and bolt assemblies 34 and 35. As a result of the gap 42 defined between the top and bottom members 29, 30, the cylinder receiving cavity 43 and the loop member receiving channels 44, 45 can accommodate a range of diameters. Moreover, once the lock has been placed on the bracket 28, tightening nut and bolt assemblies 34 and 35 prevents any movement or vibration of the lock, and permits a very secure and safe use of the loop member as illustrated in FIG. 6.

A square cavity 46 is provided in the top rear portion of the top member 29. The cavity has a counter-sunk base 47 and is designed to accommodate a bicycle accessory mount such as the light mounting element 48 illustrated in FIG. 12. The stem 49 of the element is divided into flexible prongs 50, 51 with having their base detent beads 52, 53 designed to engage the counter-sunk area 47 of the cavity 46. The mounting element 48 can be installed longitudinally or transversally in the square cavity 46.

A trapezoidal slot 54 cut into the front face of the bracket 28 is shaped and dimensioned to accept the mounting element 55 illustrated in FIG. 13. A beverage container supporting cage, not shown on the drawing, or any other accessory can be screwed into the front of the mounting member by means of a pair of screws 56, 57 which engages axial holes in the plastic cylinders 58, 59 in the center of the mounting element 55.

While the preferred embodiments of the invention have been described, modifications can be made and other embodiments may be devised without departing from the spirit of the invention and the scope of the appended claims.

What is claimed is:

1. In combination with a bicycle handlebar having a central section substantially perpendicular to a bicycle direction of travel, and a bicycle lock having a horseshoe-shaped loop element including parallel, linear end-portions and a keyed, removable loop-closing cylinder having parallel transversal bores sized to capture said end-portions, a mounting assembly which comprises:

a bracket having means for clamping over said central section of said handlebar and defining a cavity shaped and dimensioned to receive said loop-closing cylinder, and a pair of spaced-apart cross-channels sized and positioned to receive said end-portions in line with said bores.

2. The combination of claim 1, wherein said bracket projects forwardly from said central section of the handlebar, and is positioned to receive said end-portions of the loop element at a most forwardly portion of said bracket.

3. The combination of claim 2, wherein said bracket is positioned to place said end-portions of the loop element perpendicular to said central portion of the handlebar.

4. The combination of claim 3, wherein said means for clamping comprises at least one pair of adjustable reciprocating jaws capturing said central section of the handlebar.

5. The combination of claim 3, wherein said bracket comprises two symmetrical half sections.

6. The combination of claim 3, wherein said bracket comprises:

a top member and a bottom member shaped and positioned to cooperate in defining said cavity and cross-channels; and means for adjustably pressing said top and bottom members over said central of the handlebar and end-portions of the loop element.

7. The combination of claim 6, wherein said means for clamping over said central section of the handlebar comprise a rear portion of said top member and an adjustable reciprocating jaw cooperating with said rear portion to capture said central section.

8. The combination of claim 3, which further comprise means for mounting a bicycle accessory on said bracket.

9. The combination of claim 8, wherein said means for mounting comprise an accessory supporting member installed into a hole in said bracket.

* * * * *